C. A. & A. C. MATISSE.
PROJECTING LAMP.
APPLICATION FILED DEC. 9, 1913.
1,110,955.
Patented Sept. 15, 1914.
2 SHEETS—SHEET 1.
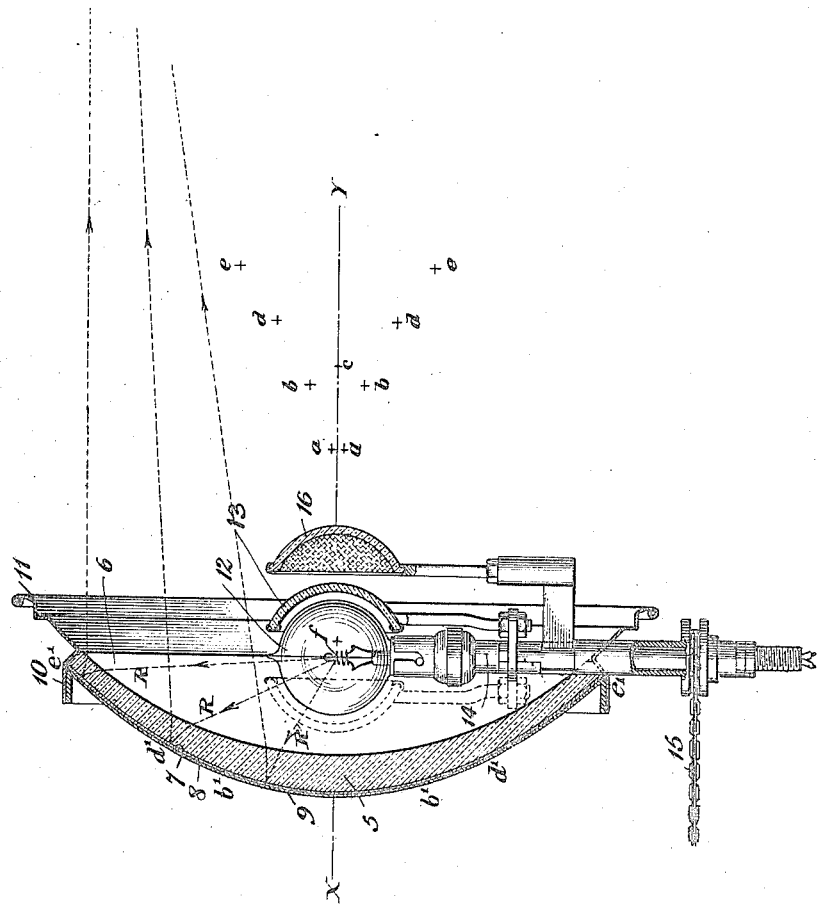
WITNESSES
INVENTORS
Curts A. Matisse
Albert C. Matisse
BY
ATTORNEYS

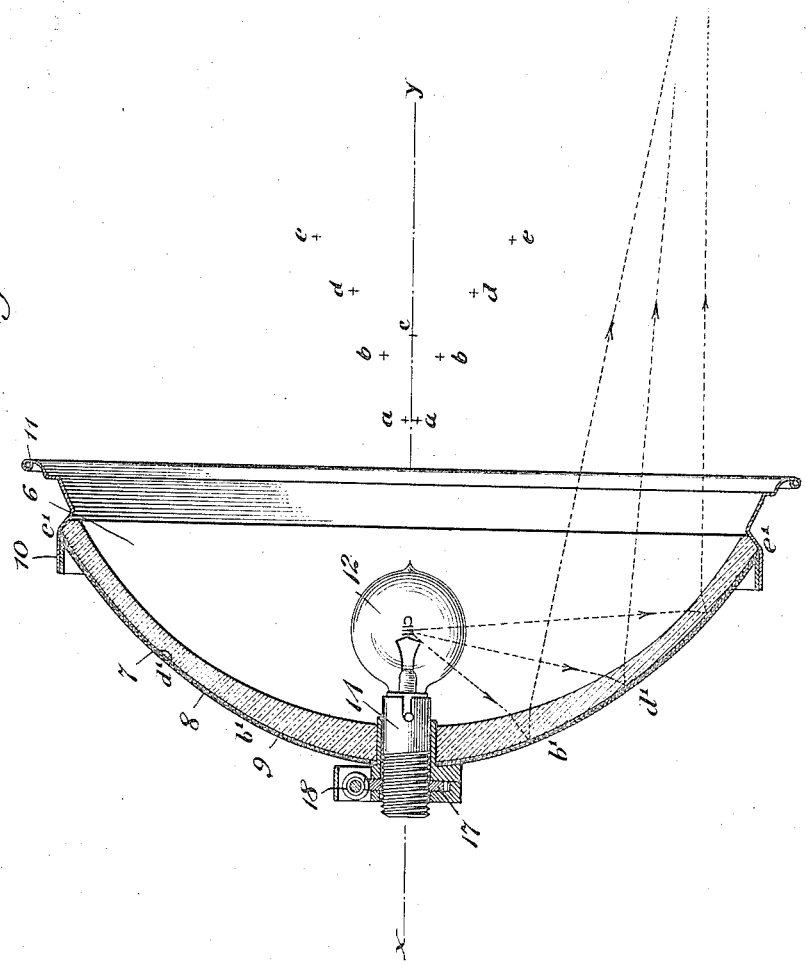

UNITED STATES PATENT OFFICE.

CARLE A. MATISSE AND ALBERT C. MATISSE, OF NEW YORK, N. Y.

PROJECTING-LAMP.

1,110,955.  Specification of Letters Patent.  Patented Sept. 15, 1914.

Application filed December 9, 1913. Serial No. 805,654.

*To all whom it may concern:*

Be it known that we, CARLE A. MATISSE and ALBERT C. MATISSE, citizens of the United States, and residents of the city of New York, New Brighton, borough of Richmond, in the county of Richmond and State of New York, have invented a new and Improved Projecting-Lamp, of which the following is a full, clear, and exact description.

Our invention relates to projecting lamps on vehicles for road illumination, and has reference more particularly to the type of lamp using a mirror lens.

An object thereof is to provide a simple, inexpensive and efficient lamp.

A further object of the invention is to provide a lamp of small depth and weight having two distinct brilliant fields of light without the use of a condenser, which not only reduce the bulkiness of the lamp but increase the lighting capacity of the same, as no light is absorbed by the condenser.

A further object of the invention is to provide a lamp wherein one of the distinct fields of light can be eliminated when the same is in use in cities.

We obtain the above objects by providing a lamp having a mirror lens, the reflecting surface of which has the shape of a paraboloid with a source of light positioned substantially in the focus of the said reflecting surface.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a vertical section through the axis of the lamp; and Fig. 2 is a modified structure of the same.

Before proceeding to a more detailed description of my invention, it must be clearly understood that while the lamp herein described is provided with an electric light the same can be used with any suitable light, as acetylene, for example, in which case the front of the lamp can be provided with a glass cover, and the means for eliminating the powerful, substantially parallel beam of light can be accomplished in different ways.

Referring to the drawings, 5 represents a lens the concave surface 6 of which is a part of a spheroid, while the convex surface 7 of the same is a portion of a paraboloid, which surface is coated with a suitable composition 8 to form a reflector from the said surface through said lens, thereby forming substantially a mirror lens, of which the reflecting surface of the mirror has the surface of a paraboloid, while the surface on which the light falls is that of a spheroid.

The lens 5 fits with its convex surface 7 against the back of the lamp frame 9, which is carried by a rim 10 also forming a portion of the lamp frame, said rim having a circular extension 11, of any suitable design, forming the front of the lamp, a portion of which is the continuation of the concave surface of the lens 5. Positioned substantially in the focus of the paraboloid is a lamp from which a light 12 falling on to the concave surface 6 of the lens is reflected by the convex surface of the lens forming the reflector, as indicated by dotted lines in the drawings. The line $x$—$y$ represents the axis of the lens on which lies the center $c$ of the concave surface and the focus $f$ of the convex surface. The points $a$ and $a$, $b$ and $b$, $d$ and $d$ and $e$ and $e$ are symmetrical with the axis $x$—$y$ and represent the centers of curvature for parts of the paraboloid between the points $b'$ $b'$, $b'$ $d'$ and $d'$ $e'$ respectively.

A ray from the light 12 traveling in the direction of the axis $x$—$y$ will be reflected by said lens in the same direction $x$—$y$ without any refraction. The other rays, falling on the concave surface 6 of the lens when entering the same, will be refracted toward the axis $x$—$y$ in view of the fact that the density of the glass is higher than that of air. By tracing the ray R, as shown in the drawings, it will be seen that as the ray from the lamp deviates from the axis $x$—$y$, the reflected ray $r$ deviates from the axis $x$—$y$ until a point is reached, when it begins to return toward the axis $x$—$y$. As will be seen from the drawings, by the traced rays R and the reflected rays $r$ the rays falling on the portion $b'$ $b'$ of the reflector deviate very rapidly from the axis $x$—$y$, but from the point $b'$ toward the point $e'$ the rays rapidly rectify and become more and more parallel to the axis $x$—$y$. The portion $b'$ $b'$ of the lens and its reflecting surface sends the beam of light at a wide angle, and this portion of the lens supplies the first distinct field, which is of great use, as it illuminates not only the front but the sides of the road for about one hundred feet ahead of the lamp. The portion $b'$ $b'$ of the convex surface 7 in combination with the lens 5 reflects the rays so as to bring them more and more parallel to the axis $x$—$y$; while the portions of the reflecting surface from $d'$ to $e'$, in combination with the lens 5, reflect the rays R from the light substantially parallel to the axis $x$—$y$, as can be seen from the drawings. The total reflecting surface $d'$ $e'$ being larger than that formed by $b'$ $b'$, the quantity of light reflected substantially parallel rays of light reflected by the surface $d'$ $e'$ is considerably larger than that reflected by the portion $b'$ $b'$, and, therefore, the illumination obtained by the reflection of the surface $d'$ $e'$ is more intense than that obtained by $b'$ $b'$. The portion of the reflected surface $b'$ $d'$ makes a gradual connection between the two beams of light above described and not only adds to the illumination of the road but forms, so to speak, a diffuser from the rays substantially parallel to the axis $x$—$y$ to the rays angular to the said axis.

The strong parallel beam of light formed by the surface $d'$ $e'$ must be intercepted when the said lamp is used for the illumination of city streets, and this we obtain by providing a spherical mirror 13 which is so mounted on the stem 14 carrying the lamp that the center of said mirror is in the center of the bulb, that is, in the focus of the concave surface. This mirror is rotatably mounted on the stem 14 and is controllable from the seat of the driver by means of a flexible connection 15. When the lamp is used on country roads the mirror is positioned as shown in the drawings in full lines, and the rays falling on the same are reflected to the concave surface of the lens thereby aiding the illumination of the concave surface by the light 12. When the lamp is used on city streets, the mirror 13 is placed in the position shown in dotted lines in the drawings by means of the flexible connection 15, thereby intercepting the rays from the light on to the concave surface of the lens 5 and reflecting the same. To make the light from said mirror more diffused, a lens 5 and reflecting the same. To make the light from said mirror more diffused, a screen 16 is positioned in front of the light, as shown in the drawings, and through which the rays reflected by the mirror 13 have to pass. This screen or diffuser 16 is preferably made of yellow glass and permanently fixed to the stem 14 of the bulb carrier. Normally, when the mirror is in position shown in full lines in the drawings, the screen 16 in front of the mirror 13 is not seen, due to the interference of rays in the beam of light produced by the lens 5 and the glaring effect of said lens.

As shown in Fig. 2, the elimination of the intense beam of parallel rays is obtained by an axial movement of the light 12, in which case the stem 14 is positioned in the axis of the lens and is threaded on its extremity and engaged therein by a worm wheel 17, which is engaged by a worm 18 controllable at the lamp, or, if desired, from the driver's seat. By moving the said light 12 toward the lens, the parallel rays are converted into rays angular with respect to the axis $x$—$y$, thereby increasing the number of angular rays effective at a short distance from the lamp.

From the above description it will be seen that in our lamp, by providing a mirror lens of which the reflecting surface is in the shape of a paraboloid, we dispense with the commonly used condenser to obtain the two distinct fields of light, and thereby not only increase the illuminating power of the lamp but reduce its weight and price, making the same more compact. The provision whereby the intense beam of parallel rays can be eliminated permits the use of the lamp as effectively on city streets as on country roads. The provision of the additional concave mirror for utilizing the rays of light normally not directed on to the mirror lens, increases further the luminosity of the lens; and the provision of the diffuser coacting with the concave mirror permits the use of said lamps in cities where the ordinance forbids the use of glaring lights.

It is evident that various changes might be made and modifications resorted to in the construction and arrangement of the parts described without departing from the spirit and scope of our invention; hence, we do not wish to limit ourselves to the exact construction shown.

Having thus described our invention, we claim as new and desire to secure by Letters Patent:

1. In a projecting lamp, a convexo-concave lens having the convex surface formed into a reflector, said convex surface being a part of a paraboloid and the concave surface that of a spheroid.

2. In a projecting lamp, a concavo-convex mirror lens the convex surface of which is generated by a parabola, and the concave surface by a circle, the convex surface of the lens forming the mirror, said lens decreasing in thickness from the center to the periphery.

3. In a projecting lamp, a mirror lens and a source of light associated therewith, said mirror lens having a paraboloid reflecting surface so related to said source of light that the central portion of said mirror lens will reflect the rays from the source angularly to the axis of said mirror lens, while the remaining portion of said mirror lens will reflect the rays from the source substantially parallel to the axis of the same; and means associated with the source of light whereby the rays substantially parallel to the axis of the mirror lens can be eliminated.

4. In a projecting lamp, a mirror lens having a paraboloidal reflecting surface; a concave mirror axial with said mirror lamp and facing the same; a source of light positioned intermediate said mirror lens and concave mirror and substantially in the focus of said reflecting surface of said mirror lens; and means for moving said concave mirror between said source of light and said mirror lens whereby the rays from said source of light to said mirror lens are intercepted by said concave mirror.

5. In a projecting lamp, a mirror lens having a paraboloidal reflecting surface; a concave mirror axial with said mirror lens and facing the same; a source of light positioned intermediate said mirror lens and concave mirror, said light being substantially in the focus of the reflecting surface of said mirror lens and the center of said concave mirror; and means whereby said concave mirror can be placed intermediate said source of light and said mirror lens, thereby forming a reflector for said source of light from the lamp and intercepting the rays to said mirror lens.

6. In a projecting lamp, a mirror lens having a paraboloidal reflecting surface; a source of light substantially in the focus of said reflecting surface; a concave mirror facing said mirror lens and adapted to reflect rays from said source of light on to said mirror lens; means for moving said concave mirror intermediate said source of light and said mirror lens whereby the concave mirror forms a reflector for said concave light by intercepting the rays from said mirror lens; and a diffuser adapted to intercept the rays from said concave mirror and source of light when the said concave mirror is positioned intermediate the light and the mirror lens.

7. In a projecting lamp, a reflector, a second reflector facing the first, a source of light therebetween, a normally inoperative diffuser adapted to co-act with said second reflector, and means for moving the second reflector between the light and the first reflector whereby said diffuser is rendered operative.

In testimony whereof we have signed our names to this specification in the presence of two subscribing witnesses.

CARLE A. MATISSE.
ALBERT C. MATISSE.

Witnesses:
   JOSEPH A. BRUNO,
   CLIFFORD C. WIGG.